United States Patent
Shimada

(10) Patent No.: US 7,077,272 B2
(45) Date of Patent: Jul. 18, 2006

(54) ANTIBACTERIAL MEMBER, METHOD OF PREPARING THE SAME, ANTIBACTERIAL FILTER AND ANTIBACTERIAL CONTAINER

(75) Inventor: Kazunori Shimada, Shibuya (JP)

(73) Assignee: Healthybank Co., Ltd., Osaka (JP)

( * ) Notice: Subject to any disclaimer, the term of this patent is extended or adjusted under 35 U.S.C. 154(b) by 0 days.

(21) Appl. No.: 10/021,029

(22) Filed: Dec. 19, 2001

(65) Prior Publication Data

US 2002/0139732 A1    Oct. 3, 2002

(30) Foreign Application Priority Data

Dec. 20, 2000  (JP) .............................. 2000-386753
Nov. 16, 2001  (JP) .............................. 2001-351648

(51) Int. Cl.
*B01D 24/00*  (2006.01)
*B01D 39/06*  (2006.01)
*C02F 1/00*   (2006.01)
*C02F 1/48*   (2006.01)
*C02F 1/62*   (2006.01)

(52) U.S. Cl. ..................... 210/501; 210/314; 210/315; 210/288; 210/289; 210/290; 210/295; 210/503; 210/506; 210/509; 424/539

(58) Field of Classification Search ........ 210/287–290, 210/501, 503, 509, 506, 169, 259, 322, 338; 424/539

See application file for complete search history.

(56) References Cited

U.S. PATENT DOCUMENTS

| | | | | |
|---|---|---|---|---|
| 5,011,602 A | * | 4/1991 | Totani et al. | 210/484 |
| 5,205,932 A | * | 4/1993 | Solomon et al. | 210/264 |
| 5,628,900 A | * | 5/1997 | Naito | 210/223 |
| 5,714,065 A | * | 2/1998 | Huder | 210/413 |
| 5,829,645 A | * | 11/1998 | Hennemann | 222/189.09 |
| 5,861,430 A | * | 1/1999 | Markonius | 514/456 |
| 6,153,228 A | * | 11/2000 | Shibuya et al. | 424/539 |

* cited by examiner

*Primary Examiner*—John Kim
*Assistant Examiner*—Krishnan S. Menon
(74) *Attorney, Agent, or Firm*—Finnegan, Henderson, Farabow, Garrett & Dunner, LLP

(57) ABSTRACT

An antibacterial member is constituted such that a propolis component is contained in, or adhered to, a water-insoluble base member. This antibacterial member is mixed into a filter member to be disposed in a flow passage in an antibacterial filter. Water in the antibacterial filter receives the antibacterial action from the propolis component when coming in contact with the antibacterial member. Thus, microorganisms in water is extinguished, and generation and propagation of germs, bacteria, algae and the like are suppressed.

2 Claims, 7 Drawing Sheets

ANTIBACTERIAL MEMBER, METHOD OF PREPARING THE SAME, ANTIBACTERIAL FILTER AND ANTIBACTERIAL CONTAINER

BACKGROUND OF THE INVENTION

1. Field of the Invention

The present invention relates to an antibacterial member, a method of preparing the same, an antibacterial filter and an antibacterial container. More specifically, the invention relates to an antibacterial member capable of preventing water from putrefying, suppressing the generation of germs, bacteria and microorganisms, and suppressing the propagation of algae, by having a propolis component contained therein or adhered thereto, a process for preparing the same, an antibacterial filter and an antibacterial container.

2. Description of the Related Art

In water in a container reserving or retaining water, or in water flowing through water passages, germs of various sorts are propagated to putrefy, or germs, bacteria and microorganisms are generated, or algae are propagated.

As technologies for suppressing the putrefaction of water, generation of germs and propagation of algae, there has been employed a method of dissolving a germicide such as chlorine or the like in water, a method of filtrating to remove germs in water by using a hollow fiber membrane filter or a reverse-osmosis membrane filter, a method of extinguishing germs of various sorts in water such as by heating, applying a pressure, supplying an electric current or irradiating ultraviolet rays, or a technique of extinguishing germs of various sorts in water by using an antibacterial member containing metal ions.

However, the method of dissolving a germicide in water involves a possibility of side effect upon a human body, the method that uses the filter involves a problem that the filter is clogged by the germs adhered thereto and therefore, it is difficult to use the filter for a long period of time, and the method that executes such treatments as heating at a high temperature, applying a high pressure, supplying an electric current or irradiating ultraviolet rays, causes an apparatus to become complex in the structure, resulting in an increase in the cost. Further, the technique that uses the antibacterial member containing metal ions is not quite free from causing side effect even in a case there is used a metal such as silver or the like which is little likely to cause harm to the human body.

Many of filters such as water purifier, water refining unit and water activator are designed to remove chlorine in the filtrating step to remove an odor specific to tap water. However, since the tap water from which chloride is removed is retained in the flow passage in the filter, it is very likely that germs of various sorts are propagated in the filter. Therefore, the filter member must be frequently changed or water that flows out first (i.e., water that has retained in the water purifier) must be drained off.

SUMMARY OF THE INVENTION

In order to cope with the above-mentioned problems, it is an object of the present invention to provide an antibacterial member capable of preventing water from putrefying, suppressing the generation of germs, bacteria and microorganisms, and suppressing the propagation of algae by using a member having a high antibacterial characteristic and a low possibility of side effect, a process for preparing the same, an antibacterial filter and an antibacterial container using the antibacterial member.

In order to accomplish the above-mentioned object, an antibacterial member according to the present invention is constituted such that a propolis component is contained in, or adhered to, a water-insoluble base member.

According to this constitution, germs of various sorts in water are extinguished when coming in contact with the propolis component contained in, or adhered to, the water-insoluble base member. Thus, it is possible to prevent water from putrefying, the generation of germs, bacteria and microorganisms, and the propagation of algae.

A method of preparing an antibacterial member is constituted such that a solution in which a propolis component is extracted is formed by dissolving a water-insoluble propolis material in alcohol, acetone or ether, a water-insoluble base member is immersed in the formed propolis-extracted solution, and the immersed base member is taken out from the propolis-extracted solution to be dried.

According to this constitution, since the water-insoluble propolis is used as a material, the propolis component is hardly to elute out into water. Further, the adherence of propolis component to the base member is improved since the base member is immersed in the solution in which the water-insoluble propolis is extracted with an alcohol. Therefore, an odor and a taste specific to propolis are hardly to be imparted to water, so that an antibacterial member of a high durability can be constituted.

Further, the constitution may be such that, after taking out the base member that has been immersed in the propolis-extracted solution, the base member is pressurized. Thus, the containing performance of propolis component inside the base member can be improved.

An antibacterial filter according to the present invention is the one for filtrating water, in which the antibacterial member constituted such that the propolis component is contained in, or adhered to, the water-insoluble base member is arranged in a flow passage.

According to this constitution, since the base member containing therein or adhering therewith the propolis component is arranged in the flow passage, water can be sterilized during it flows through the filter, and also the propagation of germs of various sorts in the filter can be prevented.

Further, an antibacterial filter according to the present invention is the one for filtrating water, in which a flow passage constituting member is formed of the antibacterial member constituted such that the propolis component is contained in, or adhered to, the water-insoluble base member.

According to this constitution, since the flow passage constituting member is formed of the base member containing therein, or adhering therewith, the propolis component, water can be sterilized during passing through the filter and also, germs of various sorts can be prevented from the propagation in the filter.

An antibacterial container according to the present invention is a container that retains water formed of the antibacterial member constituted such that the propolis component is contained in, or adhered to, the water-insoluble base member.

According to this constitution, since the container is formed of the base member containing therein, or adhering therewith, the propolis component, the whole water retained in the container comes into contact with the propolis component due to the Brownian motion of water molecules in the container. Hence, the retained water is sterilized and is prevented from putrefying.

Other objects, features and advantages of the present invention will become apparent from the following description of the embodiments in conjunction with the accompanying drawings.

DESCRIPTION OF THE PREFERRED EMBODIMENTS

Figure 1:
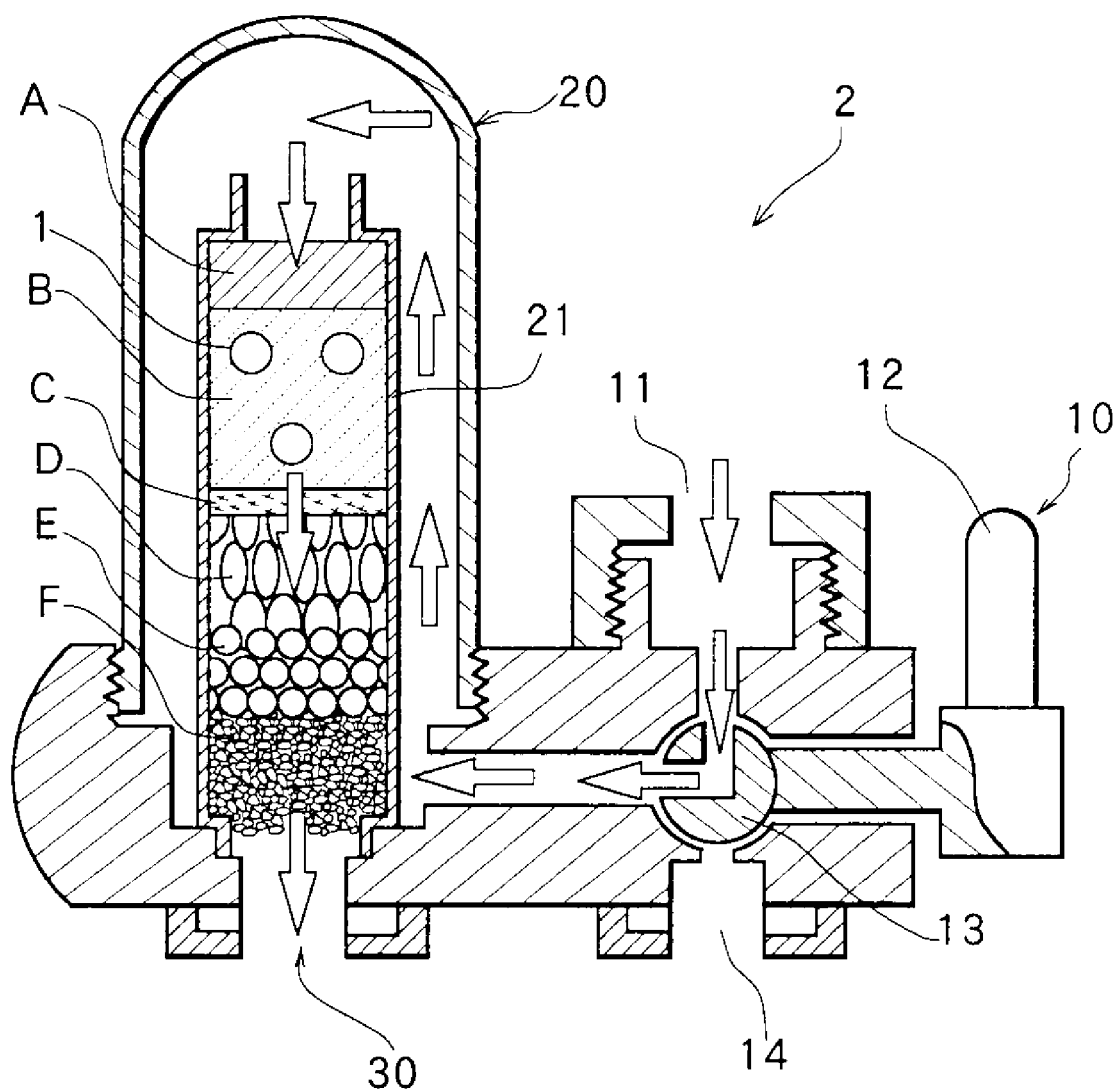
FIG. 1 is a front sectional view illustrating a water purifier as a first embodiment of an antibacterial filter of the present invention.

FIG. 1 illustrates an antibacterial filter according to a first embodiment of the present invention. This antibacterial filter is a water purifier 2 to be directly coupled to a faucet in which a propolis ceramics 1 as an antibacterial member of the present invention is arranged in a flow passage. The water purifier 2 comprises a water introduction unit 10 that introduces therein tap water, a water purifier unit 20 that purifies the tap water, and a water discharge unit 30 that discharges the purified tap water.

The water introduction unit 10 comprises a water introduction port 11 capable to be attached to the faucet, a selector lever 12 that selects either the tap water be purified or be discharged as it is, and a flow passage switching valve 13 that switches the flow passage, cooperatively with the selector lever 12. The water introduction unit 10 introduces therein the tap water at the same time when the faucet is opened, to lead the water to the flow passage in accordance with the selection by the selector lever 12. When the selector lever 12 selects the tap water be untreated, the flow passage switching valve 13 permits the tap water to be discharged without being treated through an untreated water discharge port 14 formed on the lower side. Whereas, when the selector lever 12 selects the tap water be purified, the flow passage is switched to the water purifier unit 20.

The water purifier unit 20 is disposed on the downstream of the flow passage of the water that has been introduced by the water introduction unit 10 and has been switched to the flow passage for a purification treatment by the flow passage switching valve 13. The water purifier unit 20 is a cylindrical container in which a cylindrical cartridge 21 is concentrically arranged. The cartridge 21 contains plural kinds of filter members formed in layers, i.e., from the upstream side, a heavy metal-removing layer A, an activated carbon layer B, a heavy metal-adsorbing mat C, a reducing ceramic layer D, a negative ionic ceramic layer E and a functional ceramic layer F.

The heavy metal-removing layer A is fulfilled with heavy metal-removing substances such as bone charcoal of fish, to adsorb and remove heavy metals in water.

The activated carbon layer B is fulfilled with powdery activated carbon of a high purity and a high hardness, made from the coconut husk, and decomposes chlorine for sterilization that is a cause of odor of chlorinated lime while remaining mineral components in the tap water, to adsorb and remove organic chloride compounds such as trihalomethane and the like, and also to remove an odor of algae, mold or rust. This layer is mixed with an appropriate amount of propolis ceramics 1 having a particle diameter of about 9 mm. The propolis ceramics 1 may be mixed not only in the activated carbon layer B but also in any other layers.

The propolis ceramics 1 is constituted such that ceramic particles is used as the water-insoluble base member, and the propolis component is contained in, or adhered to, the ceramic particles. The reason why the base member is made of ceramics, is that the hardness and components of the base member can be adjusted by selecting kinds of the potter's clay serving as the material and the temperature of firing. For example, a hard base member is used at places where the flow speed is high, while a base member containing components favorable for a living body is used for a drinking water container. Thus, it becomes possible to prepare the antibacterial member suitable for the environment in which it is used and for the use of water. The propolis component is the one contained in the propolis such as flavonoid, quercetin, phenetyl ester of caffeic acid, chlordane-type diterpene or antipyrin C, and exhibits antibacterial action, anti-inflammatory action, antioxidizing action and anti-allergic action. The propolis is a natural substance constituted such that the honey bees create by blending the resinous substances picked up from the plants with the bee's glandular secretions in order to prevent enemies such as microorganisms, insects and viruses from entering into the beehive.

In this way, by mixing the propolis ceramics 1 into the activated carbon layer B, it is possible to sterilize the tap water which has lost chlorine and to turn the tap water into the one having a pharmacological activity.

The heavy metal-adsorbing mat C is obtained by mixing a fine particular heavy metal-removing substance onto an activated carbon fiber to form a mat shape, and performs the chlorine removal and removes lead components eluted out from the tap water pipes.

The reducing ceramic layer D is fulfilled with ceramic particles prepared by mixing a powdered shell into the potter's clay followed by firing, and leads the water to be weakly alkaline, and lower the oxidation/reduction potential of water thereby suppressing the activity of active oxygen that could cause diseases such as cancer and the like.

The negative ionic ceramic layer E is fulfilled with ceramic particles prepared by mixing powdered ore to the potter's clay followed by firing, and arranges the molecular structure of water by decomposing clusters and turns the tap water into water with a high permeability into the cells of living bodies.

The functional ceramic layer F is fulfilled with ceramic particles made of the potter's clay kneaded with π-water that is considered to be infinitely close to water of living body, and transforms the tap water into water having a high degree of activity owing to its high energy.

The water discharge unit 30 is provided on the downstream of the flow passage of water purified through the water purifier unit 20. The water discharge unit 30 is to discharge the tap water after purified, and includes a purified water discharge port communicated with an opening formed in the lower end of the cartridge 21.

Here, a method of producing the propolis ceramics 1 mixed into the active carbon layer B in the cartridge 21 will be described in detail.

First, the water-insoluble propolis material is dissolved in alcohol, acetone or ether to form a solution extracted with much flavonoid component from the propolis. As the water-insoluble propolis material described above, for example, a frozen mass of propolis is pulverized and is introduced into alcohol or the like and is left to stand for a predetermined period of time. Thereafter, a supernatant solution is collected.

The supernatant solution is a propolis-extracted solution extracted with the propolis component, and the ceramic particles are immersed in the solution and are left to stand under the conditions of normal temperature and normal pressure for 20 hours or more and, preferably, for about 48 hours. The ceramic particles are porous and are obtained by firing the potter's clay at 1200 to 1220° C.

The ceramic particles are taken out from the propolis-extracted solution to be dried. Here, the ceramic particles taken out are introduced into a pressure container, supplied with a carbonic acid gas to be sealed therein, and are pressurized under 20 to 40 atms., preferably, under about 30 atms. for about one hour. Thus, the propolis component in the propolis-extracted solution enters into the interior of the ceramic particles to be contained therein.

After the application of pressure is terminated, the ceramic particles are dried in the pressure container sufficiently. Thus, the alcohol component is volatilized and also the propolis component is firmly adhered to the ceramics.

In the antibacterial member to be used for the water purifier, it is required that the odor and taste specific to the propolis are not imparted to water and that the durability of antibacterial effect is highly improved. According to the present invention, the water-insoluble propolis is contained in, or adhered to, the base member so that the propolis component is hardly to elute out into water, and further the water-insoluble propolis is pressurized after being immersed in the propolis-extracted solution and is dried sufficiently after the application of pressure is terminated, so that the propolis component is adhered more firmly. There is thus constituted the antibacterial member with the high durability of the antibacterial and pharmacological effects but without imparting the odor or taste specific to the propolis to water.

Next, described below is how to use the water purifier 2. When the purification treatment is selected by the switching of the selector lever 12, the water introduced through the water introduction unit 10 is, then, introduced into the water purifier unit 20 through a communication passage communicated with the bottom of the container. The water introduced into the water purifier unit 20 flows upward through space (namely, space between the container and the cartridge 21) on the outer side of the cartridge 21, to enter into the cartridge 21 through an opening formed at an upper end of the cartridge 21. The water is filtrated during it travels down through the cartridge 21, and, as a result, the above-mentioned purification treatment is executed. Thereafter, the water is discharged from the water discharge unit 30 communicated with an opening formed at the lower end of the cartridge 21.

On the contrary, when the untreated water is selected by the switching of the selector lever 12, the water is discharged as it is, from the untreated water discharge port 14 disposed below the flow passage switching valve 13.

At this time, germs of various sorts and sludge that have been removed by filtrating tend to stay, and, hence, tend to be propagated, in the activated carbon layer B in the cartridge 21. However, since the propolis ceramics 1 is mixed in the filter material of the activated carbon layer B, germs of various sorts that have been removed by filtrating can be extinguished without using chemicals that may cause side effects upon the human body. Thus, the sanitary condition of the filter member is maintained. Further, the water that comes in contact with the propolis ceramics 1 receives the antibacterial and pharmacological actions of the propolis, and becomes desirable for the living bodies.

The period of durability of the water purifier 2 in this embodiment is very longer than the period of durability of the typical water purifiers for household use, which is usually two years. Generally, the period of durability of the water purifier is not set depending upon the duration of the filtrating function of the filter material (that is, 5 years in the case of the filter member for removing chemical substances, and 20 years in the case of the filter member for removing chlorine) but is usually set depending upon the years before germs of various sorts start to be propagated in the filter member. In the case of the water purifier 2 of this embodiment, since germs of various sorts are hardly to be propagated in the filter member; the water purifier 2 can be used until the filter member loses its function.

The following experiment of flowing water was executed on the water purifier 2 of this embodiment (hereinafter referred to as "example"), and the water purifier having the same constitution as that of the embodiment except that propolis ceramics is not mixed therein (hereinafter referred to as "comparative example").

In a typical water purifier for household use, a treating capacity of at least 4 tons per year is required or a treating capacity of 11 liters per day is required. Therefore, the tap water of 20 tons being 5 times of required treating capacity, was flown to inspect water retained in the water purifier. Generation of microorganisms was not confirmed in the example but was confirmed in the comparative example. Thus, it was confirmed the high antibacterial performance of the water purifier using the antibacterial filter of the present invention.

In the above-mentioned embodiment, the filter member, and the base member for constituting the antibacterial member to be mixed in the filter member, may be reducing ceramics such as π-water ceramics, calcium ceramics, negative ionic ceramics or alkali ceramics, or far infrared ray ceramics. Further, they may be such ores as natural zeolite, natural medicinal stone, ortourmaline, or hard outer covering of crustacean, choral, shell, bone particles of fish, metal pieces, or granular or fibrous activated carbon, or plastic materials such as propylene and polyethylene, or nonwoven fabric or woven fabric. When an ore is used for the base member, an antibacterial member having favorable functions is constituted owing to a variety of effective components contained in the ore.

Further, the antibacterial filter of the present invention may be the one for filtrating natural water such as well water, hot spring water, mineral spring water, sea water, rain water, river water, underground water or spring water. The antibacterial filter of the present invention may be the one for producing formed water such as alkaline ionic water, activated water, functional water, drinking water, agricultural water and industrial water.

Further, the propolis ceramics 1 as the antibacterial member may be disposed in any place provided it is in the water passage, and the container of water purifier unit 20 or the cartridge 21 being the member of the flow passage may be constituted by a member containing therein, or adhering therewith, the propolis component. In this case, it is desired that this member is disposed in a site where the retained water tends to be putrefied or in the vicinities thereof.

The propolis ceramics 1 in this embodiment was prepared by immersing the base member in the propolis-extracted solution to apply the pressure. However, it is also possible that the propolis-extracted solution is contained in, or adhered to, the base member by such a method as impregnation, application, spraying or injection. Or, the propolis ceramics 1 may be prepared by mixing the water-insoluble propolis material in a desired material followed by the solidification. In this case, any known technology can be employed, such as mixing, beating, stamping, kneading, blending, pressing, solidifying with a solidifying material, baking, etc. Further, the shape of the propolis ceramics is not limited to a spherical shape only, but may be of any shape such as of dice, plate, rod, ring, lotus root, confetti, dimples formed in a surface, etc.

Figure 2:
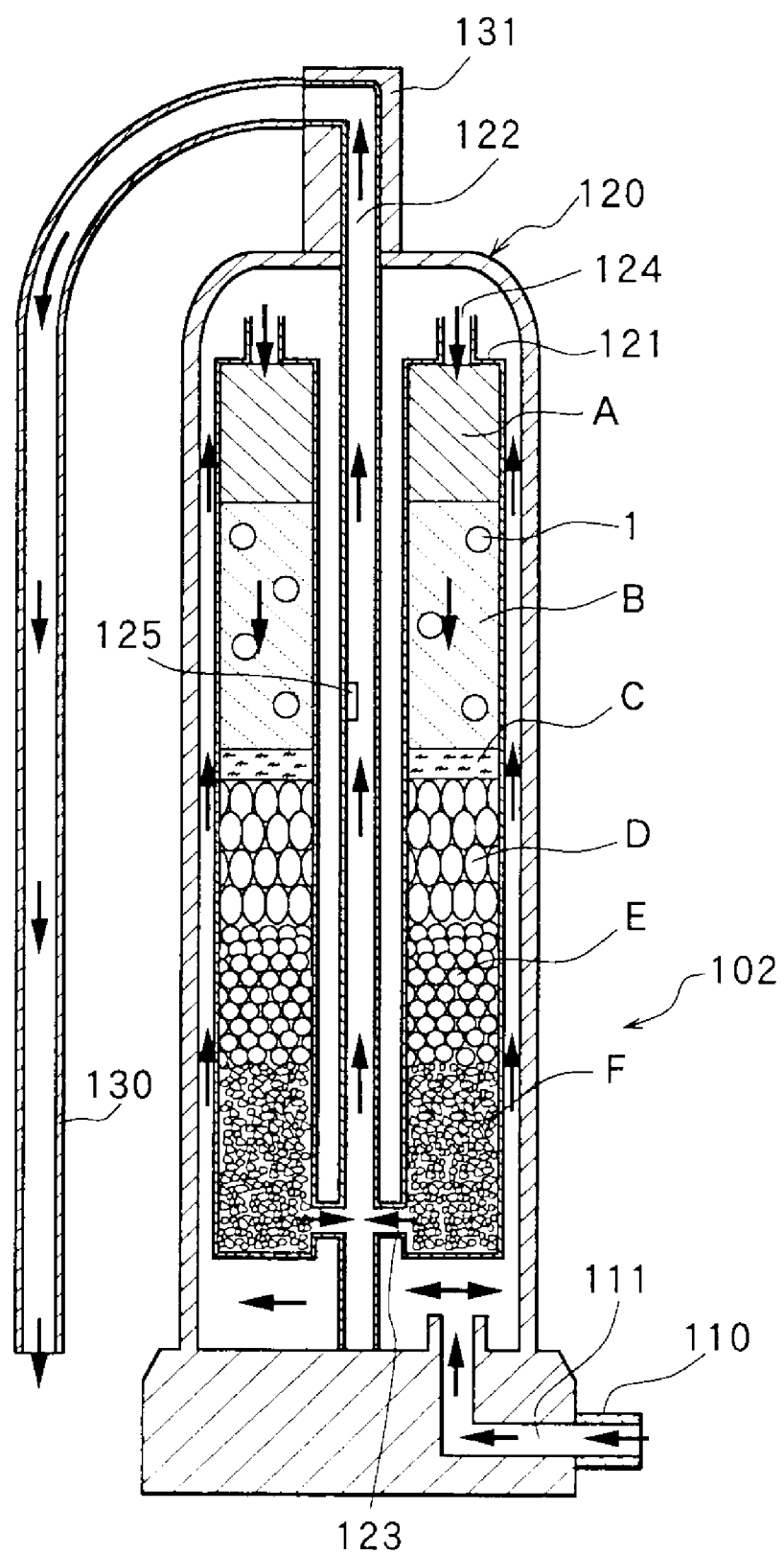
FIG. 2 is a front sectional view illustrating a water purifier as a second embodiment of the antibacterial filter of the present invention.

FIG. 2 illustrates a second embodiment of the antibacterial filter according to the present invention. This antibacterial filter is a water purifier unit 102 of installation type in which the propolis ceramics 1 as the antibacterial member of the present invention is disposed in the flow passage, and comprises a water introduction unit 110 into which the tap water is introduced, a water purifier unit 120 that purifies the tap water, and a water discharge unit 130 that discharges the purified tap water.

The water introduction unit 110 is connected to a faucet through a hose (not shown in the figure), and at the same time when the faucet is opened, introduces the tap water into the water purifier unit 120 through a communication passage 111 communicated to the bottom of a container of the water purifier unit 120.

The water purifier unit 120 is provided on the downstream side of a water flow passage of the water introduction unit 110. The water purifier unit 120 is constituted such that a cylindrical cartridge 121 of the shape of a doughnut in cross section is arranged inside of the container of a cylindrical shape, and a center pipe 122 is arranged along the center axis of the water purifier unit 120 so as to communicate with an opening 123 formed in the inner wall surface at the lower portion of the cartridge 121. Plural kinds of filter members are fulfilled in the cartridge 121, i.e., from the upper side, a heavy metal-removing layer A, an activated carbon layer B, a heavy metal-adsorbing mat C, a reducing ceramic layer D, a negative ionic ceramic layer E and a functional ceramic layer F. The members constituting the layers are the same as those of the first embodiment. The filter members, however, may be changed depending upon the functions of the water purifier (i.e., depending upon a function for removing predetermined components, function for refining water, function for activating water, etc.). At least one of the filter layers is mixed with a member containing therein, or adhering therewith, the propolis component. In this embodiment, too, the activated carbon layer B is mixed with the propolis ceramics 1.

The water introduced from the bottom of the container of the water purifier unit 120 flows upward to an opening 124 at an upper end of the cartridge 121 through space on the outer side of the cartridge 121. The water that has entered into the cartridge 121 flows downwards while being filtrated, to flow into the center pipe 122 through the opening 123 formed in the inner wall surface at the lower portion of the cartridge 121.

A magnet 125 having a central magnetic force of about 2500 gausses is disposed at an intermediate portion of the center pipe 122, so that the molecular structure of the tap water that has been purified and activated is further adjusted.

The water discharge unit 130 is provided on the downstream side of the flow passage of water that has been purified through the water purifier unit 120. The water discharge unit 130 is a flexible pipe connected to the center pipe 122 through a joint member 131 and discharges the purified water from a discharge port at an end thereof.

In the water purifier unit 102 of this embodiment, too, since the propolis ceramics 1 as the antibacterial member is mixed into the filter member, it is possible to extinguish germs of various sorts that are filtrated, without using chemicals that may cause side effects upon the human body, thereby maintaining sanitary condition of the filter member. Further, the water receives antibacterial and pharmacological action of the propolis as it comes in contact with the propolis ceramics 1 and becomes favorable for living bodies.

Figure 3:
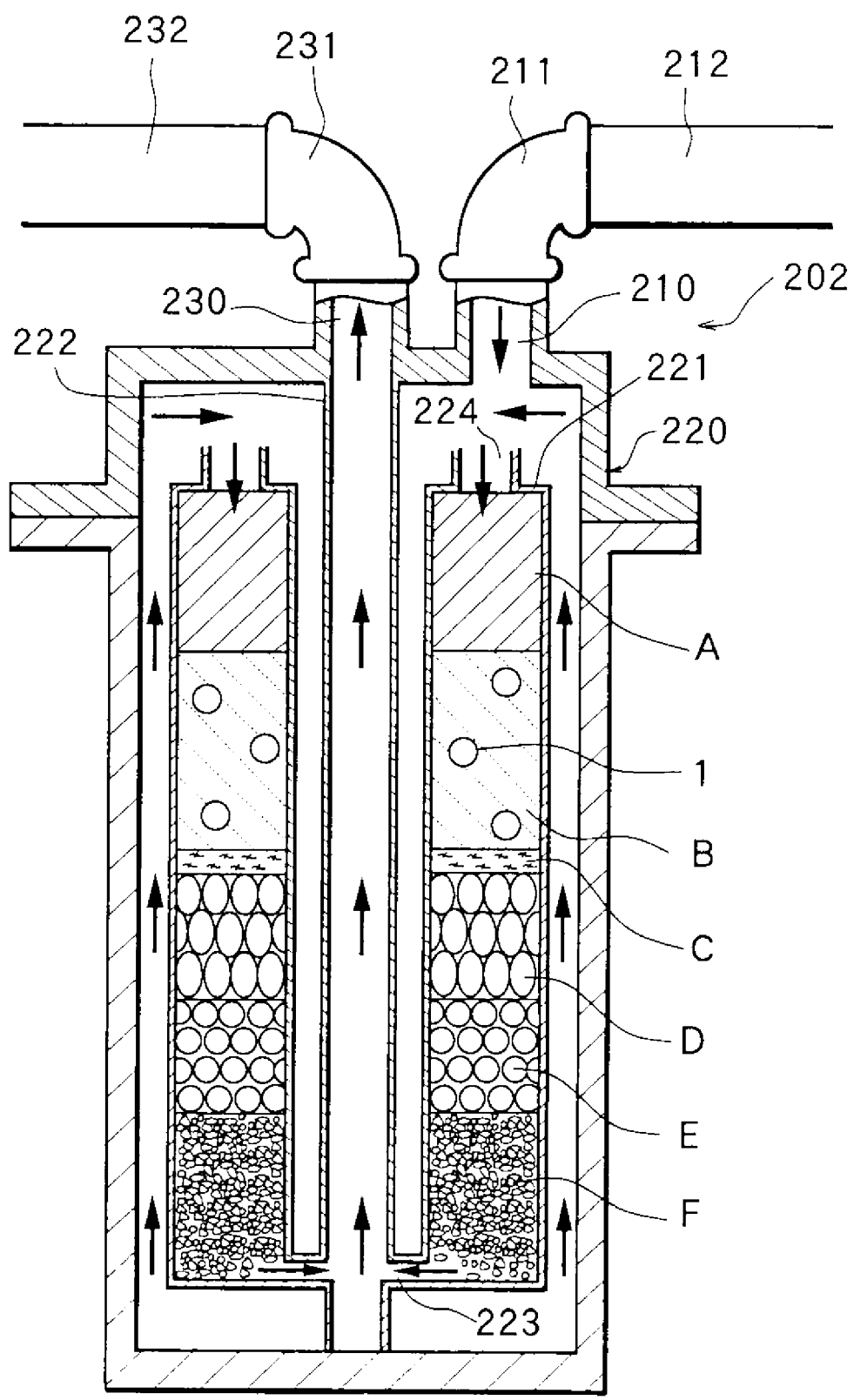
FIG. 3 is a front sectional view illustrating a water purifier as a third embodiment of the antibacterial filter of the present invention.

FIG. 3 illustrates a third embodiment of the antibacterial filter according to the present invention. This antibacterial filter is a water purifier unit 202 incorporated in the tap water pipe, and the propolis ceramics 1 as the antibacterial member of the present invention is disposed in a flow passage. The water purifier unit 202 comprises a water introduction unit 210 into which the tap water is introduced, a water purifier unit 220 that purifies the tap water, and a water discharge unit 230 that discharges the purified tap water.

The water introduction unit 210 is an opening formed in the upper surface of a container of the water purifier unit 220 and is connected to a tap water pipe 212 through a pipe joint 211.

The water purifier unit 220 is provided on the downstream side of the flow passage of the water introduced from the water introduction unit 210. The water purifier unit 220 is constituted such that a cylindrical cartridge 221 of the shape of a doughnut in cross section is arranged in the container of a cylindrical shape, and a center pipe 222 is arranged along the center axis of the water purifier unit 220 so as to communicate with an opening 223 formed in the inner wall surface at the lower portion of a cartridge 221. Plural kinds of filter members are fulfilled in the cartridge 221, i.e., from the upper side, a bone charcoal layer A, an activated carbon layer B, a heavy metal-adsorbing mat C, a reducing ceramic layer D, a negative ionic ceramic layer E and a functional ceramic layer F. The members constituting the layers are the same as those of the first and second embodiments.

At least one of the filter layers includes a member containing therein, or adhering therewith, the propolis component. In this embodiment, too, the activated carbon layer B is mixed with the propolis ceramics 1.

The water introduced from the water purifier unit 210 flows toward an opening 224 at an upper end of the cartridge 221 through space on the outer side of the cartridge 221. The water that has entered into the cartridge 221 flows downwards while being filtrated, to flow into the center pipe 222 through the opening 223 formed in the inner wall surface at the lower portion of the cartridge 221.

The water discharge unit 230 is provided on the downstream side of the flow passage of water purified in the water purifier unit 220. The water discharge unit 230 is an opening that is communicated with the center pipe 222 in the water purifier unit 220 and is formed in the upper surface of the container of the water purifier unit 220, and is connected to the tap water pipe 232 through a pipe joint 231.

In the thus constituted water purifier unit 202, too, since the propolis ceramics 1 as the antibacterial member is mixed into the filter member, it is possible to extinguish germs of various sorts that are filtrated without using chemicals that may cause side effects upon the human body, thereby maintaining sanitary condition of the filter member. Further, the water receives antibacterial and pharmacological action of the propolis as it comes in contact with the propolis ceramics 1 and becomes favorable for living bodies.

Figure 4:
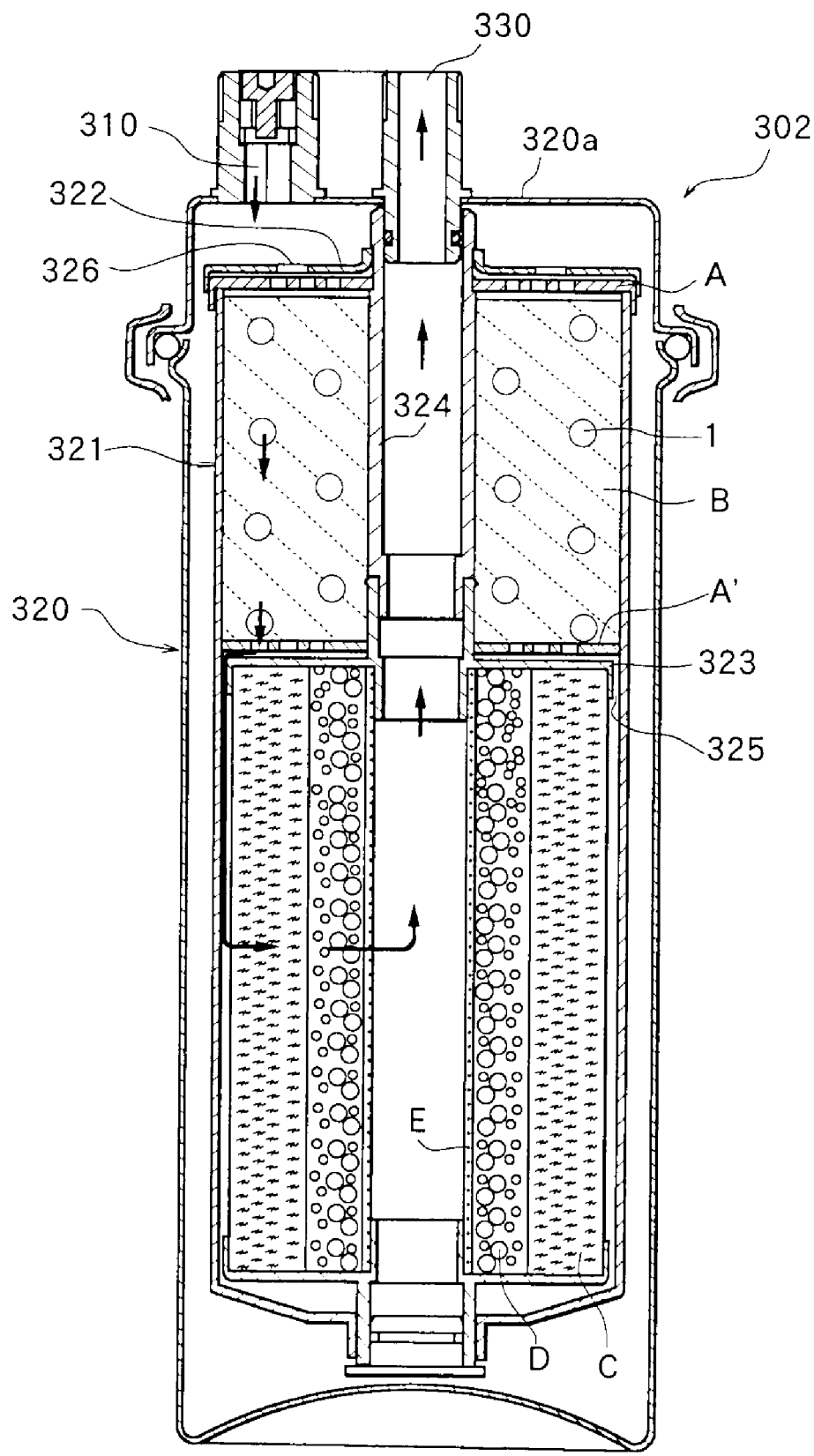
FIG. 4 is a front sectional view illustrating a water purifier as a fourth embodiment of the antibacterial filter of the present invention.

FIG. 4 illustrates a fourth embodiment of the antibacterial filter according to the present invention. This antibacterial filter is a water purifier unit 302 incorporated in the tap water pipe, and the propolis ceramics 1 as the antibacterial member of the present invention is disposed in a flow passage. The water purifier unit 302 comprises a water introduction unit 310 into which the tap water is introduced, a water purifier unit 320 that purifies the tap water, and a water discharge unit 330 that discharges the purified tap water.

The water introduction unit 310 and the water discharge unit 330 are constituted in the same manner as those of the third embodiment. The water purifier unit 320 is a cylindrical container with bottom and has a closure unit 320a provided with the water introduction unit 310 and the water discharge unit 330.

A cartridge 321 is arranged in the water purifier unit 320. The cartridge 321 is a cylindrical container having a closure unit 322, and the interior thereof is divided into upper and lower two stages by a partitioning member 323 having a hole at the central portion thereof. The partitioning member 323 is connected at a flange portion in the inner periphery thereof to a center pipe 324 to be described later, and has an outer periphery which is smaller than the inner diameter of the cartridge 321, so as to form a gap 325 relative to the inner wall surface of the cartridge 321 to form a water passage.

The cartridge closure 322 is opened at the central portion thereof, and has a plurality of small holes 326 formed in the periphery of the central portion to form water passages. A center pipe 324 is inserted in the above opening at the center. The center pipe 324 extending from the side of the water discharge unit 330 up to an intermediate position in the axial direction of the cartridge 321, is fitted at its lower end to the inner peripheral flange portion of the partitioning member 323, to communicate at its upper end with the water discharge unit 330.

In the cartridge 321, a first filtrating unit is formed in an upper space and a second filtrating unit is formed in a lower space, partitioned by the partitioning member 323.

The first filtrating unit is fulfilled with activated carbon B mixed with the propolis ceramics 1 between a filter A disposed on the lower surface of the closure unit 322 and a filter A' disposed on the upper surface of the partitioning member 323. The constitutions and functions of the activated carbon B and of the propolis ceramics 1 are substantially the same as those of the first to third embodiments.

The second filtrating unit has, in the central portion thereof, space communicated with the center pipe 324 and is provided with filter members so as to form rolled filter layers; i.e., a heavy metal-adsorbing layer C, a ceramic particle layer D and a tubular filter E arranged in this order from the outer periphery toward the center.

The heavy metal-adsorbing layer C is formed in a rolled manner by winding a fibrous heavy metal-removing member many times to be oriented in different ways, and adsorbs heavy metals contained in water. The ceramic particle layer D is fulfilled with particles such as of reducing ceramics, negative ionic ceramics and functional ceramics like the ceramic particles of the first to third embodiments, to form functional water favorable for living bodies. The filter E is a tubular member made of a resinous member and has many small holes in the wall surface.

Next, described below is how to use the thus constituted antibacterial filter 302. First, water introduced into the upper part in the water purifier unit 320 through the water introduction unit 310 is, then, introduced into the first filtrating unit through small holes 326 formed in the cartridge closure unit 322, to travel downward through the activated carbon layer B. The water, then, travels into the second filtrating unit through the gap 325 formed along the outer periphery of the partitioning member 323 to reach the whole outer peripheral surface of the heavy metal-adsorbing layer C. The water, then, is permeated into the heavy metal-removing layer C to travel in the radial direction toward the ceramic particle layer D. Then, the water flows into the central space through small holes in the wall surface of the filter E, flows into the center pipe 324 to reach the water discharge unit 330.

In the thus constituted water purifier unit 302, too, since the propolis ceramics 1 as the antibacterial member is mixed into the filter member, it is possible to extinguish germs of various sorts that are filtrated without using chemicals that may cause side effects upon the human body, thereby maintaining sanitary condition of the filter member. Further, the water receives antibacterial and pharmacological action of the propolis as it comes in contact with the propolis ceramics 1 and becomes favorable for living bodies.

The water purifier unit 320 of this embodiment may be applied to the water purifier of the type that is directly connected to the faucet as in the first embodiment, may be applied to the water purifier of the installation type as in the second embodiment, or may be applied to a water purifier of the pot type.

Figure 5:
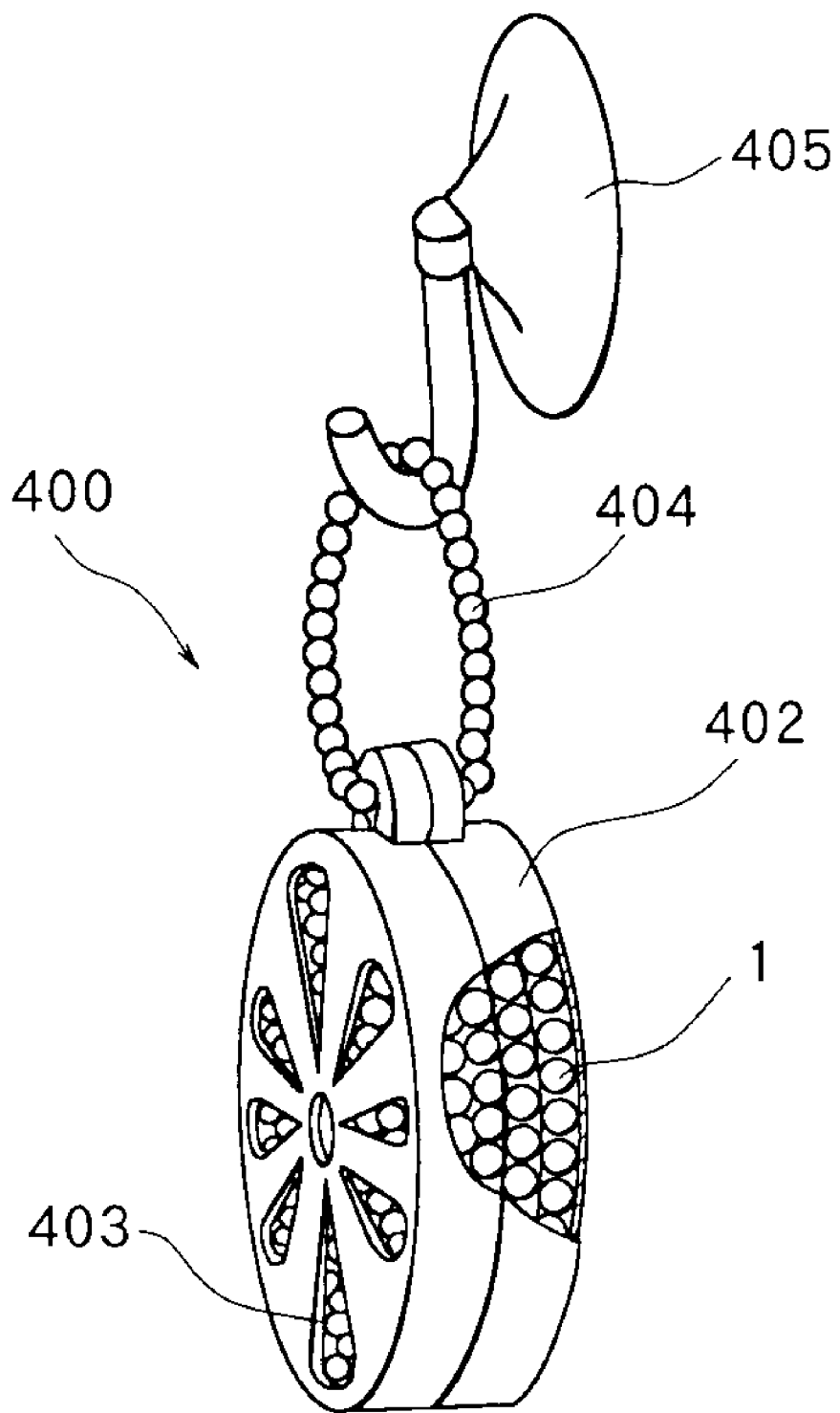
FIG. 5 is a perspective view illustrating a bath water activator that utilizes an antibacterial member of the present invention.

FIG. 5 illustrates an embodiment using the propolis ceramics 1 as the antibacterial member of the present invention as a bath water activator 400 that sterilizes and activates the bath water. The bath water activator 400 has granular propolis ceramics 1 of a size of about 9 mm fulfilled in a casing 402, and is so constituted that the bath water comes in contact with the propolis ceramics 1 through holes perforated in the casing 402. The casing 402 has a filter 403 arranged across the holes in the wall surface thereof to prevent the propolis ceramics from escaping, and is hanged on the inner wall surface of a bathtub by using, for example, a chain 405 and a sucking disk 405 with a hook.

In this embodiment, the shape of the casing 402, the shapes and sizes of the holes and of the propolis ceramics 1, can be suitably changed from the standpoint of designing, and means for installation in the bathtub may be the one in which the sucking disk is directly attached to the casing, or the one in which the casing is not secured to the bathtub but is permitted to float on the bath water or is submerged in the bath water. Further, the casing may be fulfilled with the propolis ceramics 1 in combination with activated carbon, zeolite, shell, functional ceramics or reducing ceramics. With the propolis ceramics 1 being wrapped with a filter or with the propolis ceramics being fulfilled in a bag-like filter, further, the content of the casing 402 can be easily replaced.

Figure 6:
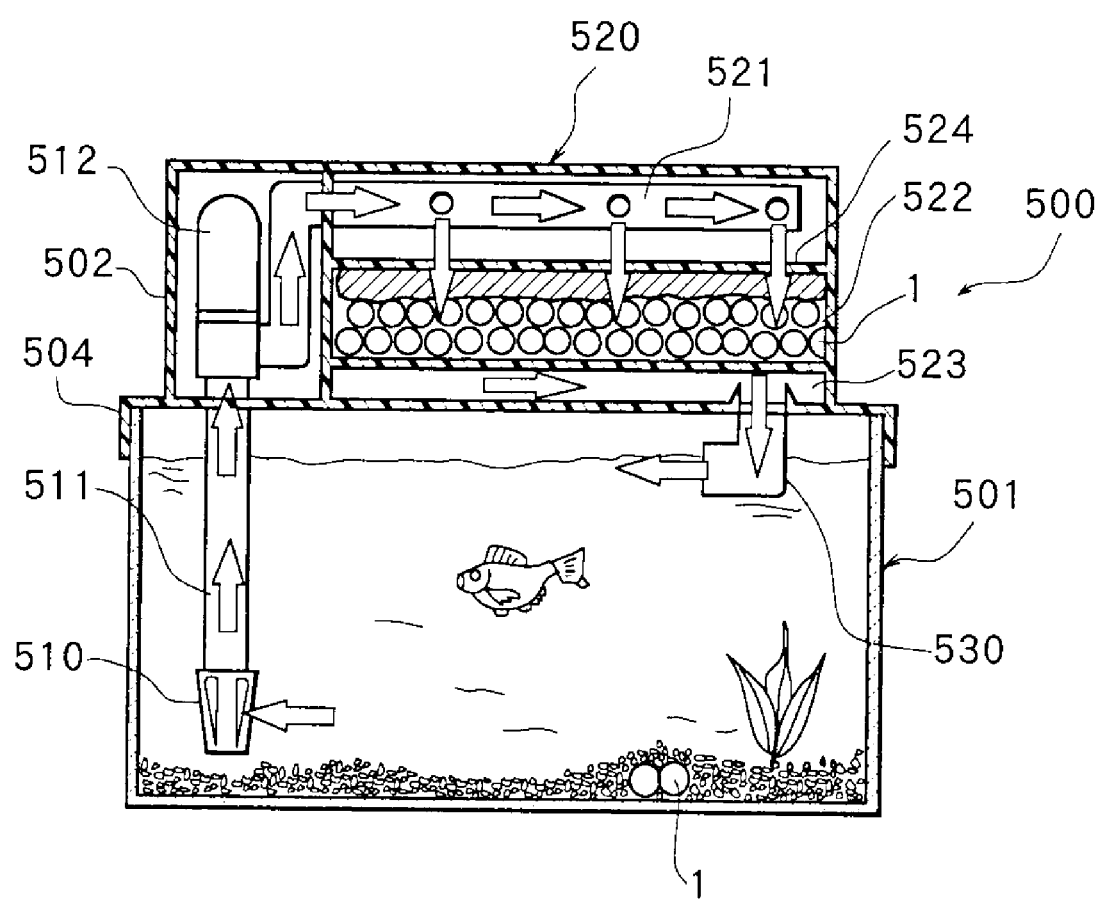
FIG. 6 is a sectional view for explaining a water vessel that utilizes the antibacterial member, the antibacterial filter and an antibacterial container according to the present invention.

FIG. 6 is a sectional view illustrating an embodiment of a water vessel set 500 for feeding fish constituted by using the propolis ceramics 1 as the antibacterial member according to the present invention, an antibacterial filter 502 according to the present invention and a water vessel 501 as the antibacterial container according to the invention. The water vessel set 500 is constituted such that the antibacterial filter 502 is mounted on the upper surface of a closure 504 of the water vessel 502 and the propolis ceramics 1 is disposed in the water vessel 501.

The propolis component is applied on the inner wall surface of the water vessel 501, pebbles are laid on the bottom of the water vessel 501, and the propolis ceramics 1 comprising ceramic particles containing therein, or adhering therewith the propolis component, is disposed in the pebbles.

The antibacterial filter 502 mounted on the closure 504 of the water vessel 501, comprises a water introduction unit 510 into which water from the water vessel 501 is introduced, a water purifier unit 520 that purifies water and a water discharge unit 530 that discharges the purified water.

The water introduction unit 510 is provided at an end of a water introduction pipe 511 extending to the lower side of the closure 504 of the water vessel 501, and sucks the water in the water vessel by a pump 512.

The water purifier unit 520 is provided with a shower pipe 521 connected to the water introduction pipe 511. On the lower side of the water purifier unit 520 is provided a filtrating unit 522, and further thereunder is provided a communication passage 523.

The filtrating unit 522 is obtained by wrapping the filter members fulfilled like layers with two pieces of cloths, the cloth laid on the uppermost surface being an antibacterial nonwoven fabric 524 containing therein, or adhering therewith, the propolis component. The lowermost layer of the filter material is the one fulfilled with the propolis ceramics 1 containing therein, or adhering therewith the propolis component.

The water discharge unit 530 is a pipe extending downward from an opening formed in the closure 504 of the water vessel 501, and supplies into the water vessel 501 the filtrated water that flows into the communication passage 523 of the water purifier unit 520.

Next, described below is how to use the water vessel set 500. Water in the water vessel 501 infiltrates into the uppermost antibacterial nonwoven fabric 524 of the filtrating unit 522 through the water introduction pipe 511 of the water introduction unit 510 and holes of the shower pipe 521 of the water purifier unit 520. After coarse contaminants are filtrated by the antibacterial nonwoven fabric 524, the water is purified through the filter member and the lowermost cloth. Germs of various sorts adhere in large amounts onto the uppermost antibacterial nonwoven fabric 524 and tend to be propagated in that place, but are readily extinguished due to the propolis component contained in the uppermost antibacterial nonwoven fabric 524. Further, since the propolis ceramics 1 is used in the filter material of the lowermost layer, the water is sterilized before being returned back to the water vessel 501.

Droppings of fish tend to stay in the pebbles laid on the bottom of the water vessel 501 causing insanitation. With the propolis ceramics 1 as the activating member for the water vessel being disposed in the pebbles, however, the pebbles can be maintained in a sanitary condition as much as possible. Due to the Brownian motion of the water molecules, further, the whole water retained in the water vessel comes in contact with the propolis ceramics 1 and with the water vessel 501, thereby maintaining a sanitary condition.

The antibacterial nonwoven fabric 524 of this embodiment is prepared by immersing a nonwoven fabric having a thickness of about 3 mm in a propolis-extracted solution obtained by dissolving a water-insoluble propolis material in alcohol, acetylene or ether, followed by drying, and contains the propolis component infiltrated into the interior of the fiber thereof.

The following two experiments were executed on the antibacterial nonwoven fabric 524 and the nonwoven fabric without immersed in the propolis-extracted solution (hereinafter referred to as "general nonwoven fabric").

In a first experiment, both of the respective nonwoven fabrics in circular shape having a diameter of 60 mm were immersed in one liter of water. The two nonwoven fabrics were inoculated with general germs of 100,000 germs/g, and preserved in a constant-temperature cultivator maintained at 36° C. for 24 hours. Thereafter, the growth of living germs was examined.

In a second experiment, both of the respective nonwoven fabrics that were not immersed in water, were directly applied with general germs of 100,000 germs/g, and preserved in the constant-temperature cultivator maintained at 36° C. for 24 hours. Thereafter, the growth of living germs was checked by a diluted flat plate method.

In the first experiment, the general germs that are surviving were not confirmed from the antibacterial nonwoven fabric, but were confirmed from the general nonwoven fabric. In the second experiment, no colony was confirmed from the antibacterial nonwoven fabric, but were confirmed from the general nonwoven fabric. From the above results, the antibacterial effect of the antibacterial nonwoven fabric 524 of this embodiment was confirmed.

Figure 7:
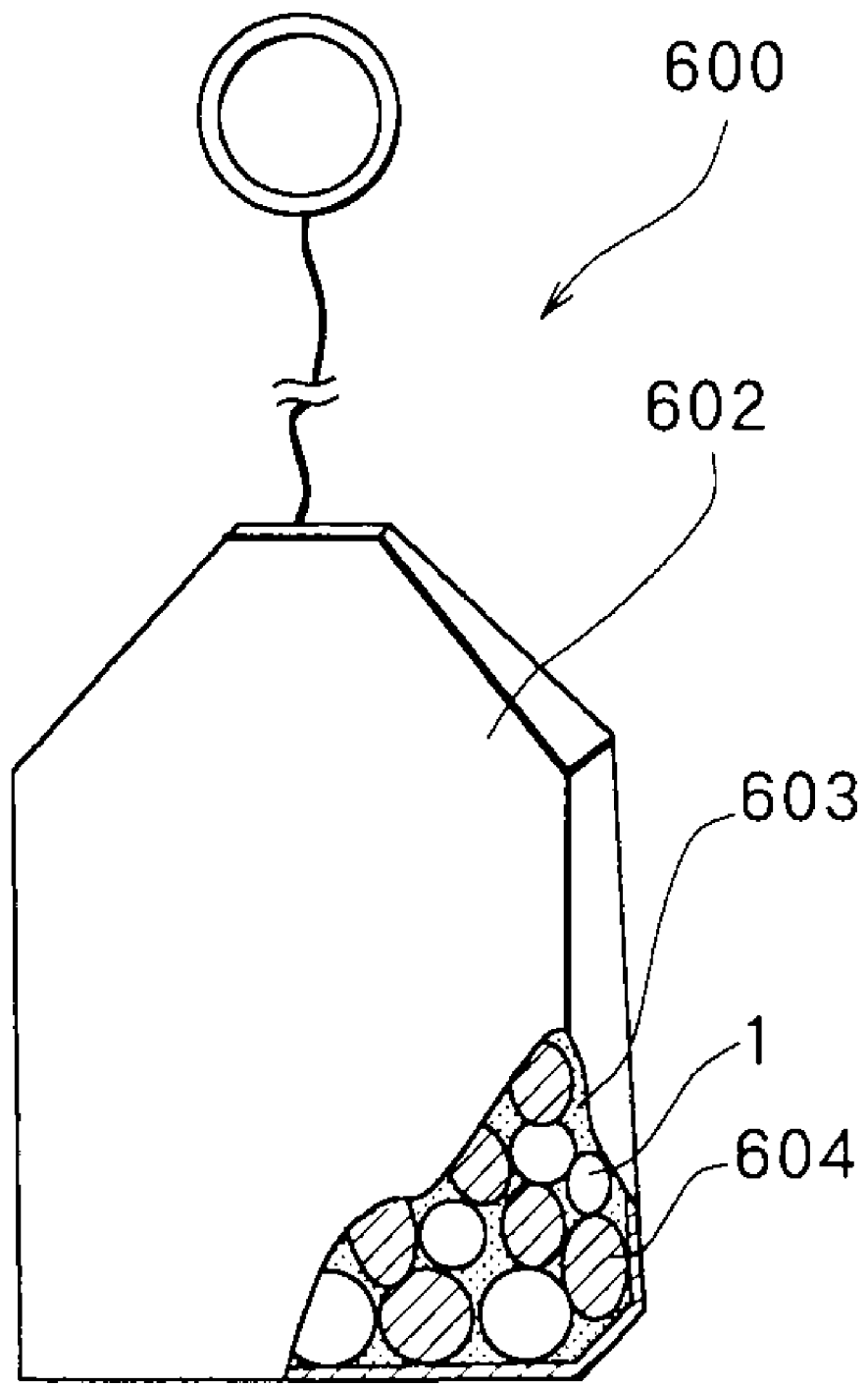
FIG. 7 is a perspective view illustrating a drinking water activator that utilizes the antibacterial member according to the present invention.

FIG. 7 illustrates an embodiment of a drinking water activator 600 that uses the propolis ceramics 1 as the antibacterial member of the present invention. This drinking water activator 600 is obtained by fulfilling granular propolis ceramics 1 of a size of about 9 mm in a bag 602 having high water permeability. The bag 602 is fulfilled with activated carbon 603 and functional ceramics 604 in addition to the propolis ceramics 1. In this case, the propolis ceramics 1 may be contained alone or in combination with a member containing calcium and the like.

Germs in drinking water in the container in contact with the propolis ceramics 1 to be extinguished, and hence, water is prevented from putrefying. Accordingly, the drinking water can be preserved for a long period of time. Further, when a person drinks the water that has come in contact with the propolis ceramics 1, it can be expected that the person takes propolis component in the body unknowingly, and the body can be protected from such diseases as gum disease, tooth decay, hepatitis, stomach ulcer, life-style related diseases, atopy, asthma, cancer and the like.

The drinking water activator 600 of this embodiment may be used for water other than the drinking water. In this case, the water activator is put into a container such as water reservoir, pitcher, can, bottle, pot, PET bottle, water heater, thermos bottle, bathtub, vessel of a washing machine, goldfish bowl or the like, so that water retained or remaining in such containers is sterilized to prevent putrefying.

What is claimed is:

1. An antibacterial filter for filtering water, comprising:
a water introduction unit adapted for introducing water therein; a water purifier unit adapted for purifying the water introduced through said water introduction unit; and a water discharge unit adapted for discharging the water purified by said water purifier unit, wherein said water purifier unit comprises:

a cylindrical container having a central axis thereof;

a tubular cartridge of a doughnut-shape in cross section, which is disposed on the center axis of said cylindrical container;

a center pipe arranged to lie along said center axis and in communication with an opening formed in an inner wall surface provided at a lower portion of the cartridge;

a magnet disposed at a longitudinally intermediate portion of the center pipe and having central magnetic force of a predetermined intensity;

plural kinds of filter members arranged in layers in a water flow passage inside said cartridge; and at least one of said plural kinds of filter members having propolis ceramics mixed therein;

said propolis ceramics comprising ceramics soaked in a solution of propolis extract, obtained from water-insoluble propolis material dissolved in alcohol, acetone or ether, and dried.

2. An antibacterial filter for filtering water, comprising:

a water introduction unit adapted for introducing water therein; a water purifier unit adapted for purifying the water introduced through said water introduction unit; and a water discharge unit adapted for discharging the water purified by said water purifier unit, wherein said water purifier unit comprises:

a container of cylindrical shape having an inside thereof, in which a tubular cartridge of a doughnut-shape in cross-section is disposed to have an interior thereof partitioned into upper and lower stages by a doughnut-shape partitioning member, said doughnut-shape partitioning member having a hole at the central portion thereof and an outer periphery defining a water passage extending between said outer periphery and an inner wall surface of said cartridge;

a center pipe inserted in said tubular cartridge to be arranged in said upper stage, above said doughnut-shape partitioning member;

a first filtering section arranged in said upper stage, and filled with activated carbon layer with which propolis ceramics are mixed;

a second filtering section formed in said lower stage constituting a rolled filter layer centrally having a spatial portion communicating with the center pipe, said rolled filter further having a heavy metal-adsorbing layer, a ceramic particle layer and a tubular filter arranged in order from the outer periphery toward the center of said rolled filter; and a magnet disposed within the center pipe having a central magnetic force of a predetermined intensity.

* * * * *